US009769542B2

(12) United States Patent
Johnson

(10) Patent No.: US 9,769,542 B2
(45) Date of Patent: Sep. 19, 2017

(54) SYSTEM AND METHOD FOR DIGITAL RIGHTS MANAGEMENT CONTROL USING VIDEO ANALYTICS

(75) Inventor: Alexander Steven Johnson, Erie, CO (US)

(73) Assignee: Verint Americas Inc., Alpharetta, GA (US)

( * ) Notice: Subject to any disclaimer, the term of this patent is extended or adjusted under 35 U.S.C. 154(b) by 2022 days.

(21) Appl. No.: 12/057,442

(22) Filed: Mar. 28, 2008

(65) Prior Publication Data

US 2009/0249486 A1    Oct. 1, 2009

(51) Int. Cl.
| | | |
|---|---|---|
| G06F 7/04 | (2006.01) |
| H04N 21/835 | (2011.01) |
| H04N 7/173 | (2011.01) |
| H04N 21/234 | (2011.01) |
| H04N 21/2343 | (2011.01) |
| H04N 21/254 | (2011.01) |
| H04N 21/4545 | (2011.01) |
| H04N 21/4627 | (2011.01) |
| H04N 21/8355 | (2011.01) |

(52) U.S. Cl.
CPC ....... *H04N 21/835* (2013.01); *H04N 7/17318* (2013.01); *H04N 21/23418* (2013.01); *H04N 21/234318* (2013.01); *H04N 21/2541* (2013.01); *H04N 21/45452* (2013.01); *H04N 21/4627* (2013.01); *H04N 21/8355* (2013.01)

(58) Field of Classification Search
CPC .............. G06F 21/10; G11B 20/00086; H04N 21/2541; H04N 21/835
USPC .............. 726/26, 33; 382/115; 348/161, 443
See application file for complete search history.

(56) References Cited

U.S. PATENT DOCUMENTS

| | | | | |
|---|---|---|---|---|
| 7,714,878 B2* | 5/2010 | Gabay et al. | ................. | 345/626 |
| 2007/0283287 A1* | 12/2007 | Taylor et al. | ................. | 715/769 |
| 2007/0296817 A1* | 12/2007 | Ebrahimi et al. | ............. | 348/161 |
| 2008/0025574 A1 | 1/2008 | Morikawa et al. | | |
| 2009/0161794 A1* | 6/2009 | Gordon et al. | ................. | 375/299 |
| 2009/0254965 A1* | 10/2009 | Smith et al. | ................. | 725/134 |
| 2010/0211776 A1* | 8/2010 | Gunaseelan et al. | ......... | 713/165 |

FOREIGN PATENT DOCUMENTS

| | | |
|---|---|---|
| EP | 2106138 A2 | 9/2009 |
| EP | 2106138 B | 9/2011 |

* cited by examiner

*Primary Examiner* — Farid Homayounmehr
*Assistant Examiner* — Suman Debnath
(74) *Attorney, Agent, or Firm* — Meunier Carlin & Curfman LLC

(57) ABSTRACT

Digital rights management (DRM) of video data is selectively applied to video data by a video processing system that receives a video, comprising a number of frames, and processes at least one frame from the video to determine the contents of the video. The digital rights management for the video is then configured based on the contents of the video.

20 Claims, 11 Drawing Sheets

SYSTEM AND METHOD FOR DIGITAL RIGHTS MANAGEMENT CONTROL USING VIDEO ANALYTICS

TECHNICAL FIELD

This invention is related to the field of video analytics. In particular, this invention is related to the configuration of digital rights management for a video through the use of video analytics.

TECHNICAL BACKGROUND

Digital rights management (DRM) is used to control the viewing and copying of digital files such as music recordings. For example, a musician may wish to sell digital copies of their music, but prevent the purchaser from distributing copies of the music. Likewise, DRM may be used to allow users to view a video over the Internet, but prevent them from saving a copy of the video. DRM is also useful for the protection of sensitive data within a company. For example, DRM for a computer file may be configured to allow access and copying by certain users, and to prevent access by all other users. Such uses of DRM to protect the intellectual property rights of owners of digital files have become widespread.

In a video monitoring environment including a number of video sources, DRM becomes much more complicated. For example, a video monitoring system may include a large number of cameras continually streaming video to a video processing system. Some of these cameras may capture sensitive information, while others only capture non-critical information. Still other cameras may pan into sensitive areas, while others may capture sensitive information periodically while normally capturing non-critical information. Configuring DRM for such a system is enormously complicated since the desired configuration not only varies from camera to camera, but also varies within the video stream from a single camera.

Overview

Digital rights management (DRM) of video data is selectively applied to video data by a video processing system that receives a video, comprising a number of frames, and processes at least one frame from the video to determine the contents of the video. The digital rights management for the video is then configured based on the contents of the video.

Configuring digital rights management may include prohibiting copying of the video. Processing at least one frame from the video may comprise detecting a location shown in the video, and configuring digital rights management for the video based on the location. Alternatively, processing at least one frame from the video may comprise detecting an object shown in the video, and configuring digital rights management for the video based on the object, which may include obscuring the object in the video.

Processing at least one frame from the video may comprise detecting an event shown in the video, and configuring digital rights management for the video based on the event, which may include obscuring at least a portion of the video during the event.

In another embodiment, a video processing system comprising an interface configured to receive video, and a processor electrically coupled with the interface is provided. The processor is configured to receive a video, comprising a plurality of frames, from the video interface, and process at least one frame from the video to determine the contents of the video. The processor then configures digital rights management for the video based on the contents of the video.

In a further embodiment, a computer-readable medium having instructions stored thereon for operating a computer system is provided. The instructions, when executed by the computer system, direct the computer system to receive a video, comprising a plurality of frames, process at least one frame from the video to determine contents of the video, and configure digital rights management for the video based on the contents of the video.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As discussed above, in many applications, such as surveillance systems, it is often desirable to protect portions of video data, while allowing unlimited copying of the remainder of the data. For example, some locations may be inherently sensitive to propagation of video data, such as a pharmacy counter in a supermarket. If a panning camera is capable of recording video of a wide area that includes a pharmacy counter, it may be desirable to configure digital rights management (DRM) such that the video may be freely copied except for the portions of the video showing the pharmacy counter in order to protect patient privacy. It may also be advantageous to configure the DRM such that only certain authorized users may view the portions of the video showing the pharmacy counter, while all other users would not be able to view that portion of the video data.

Figure 1:
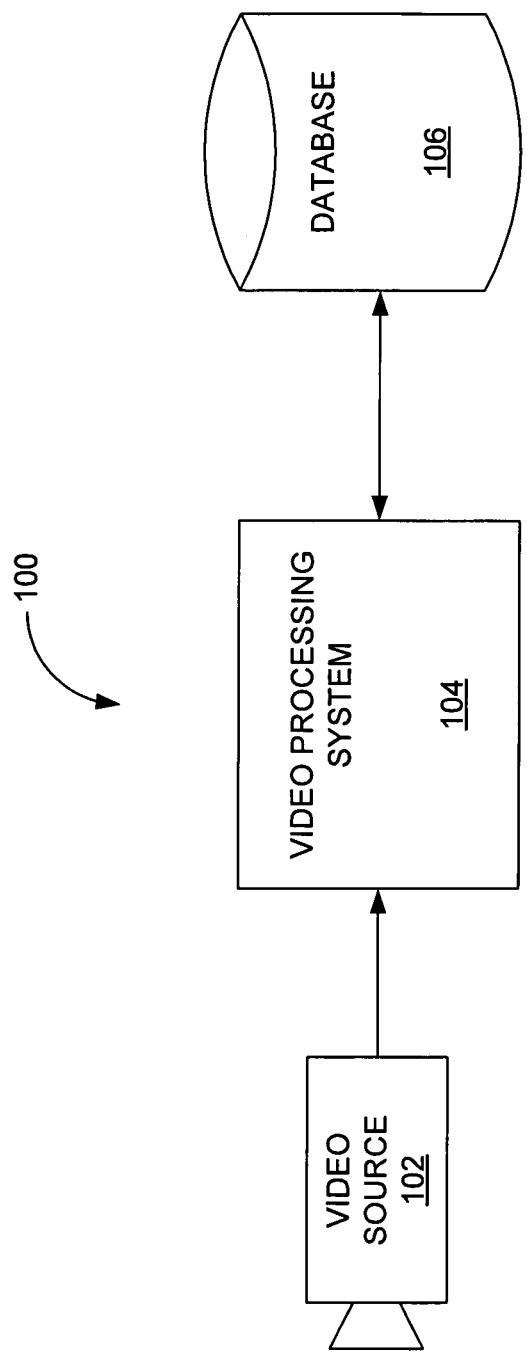
FIG. 1 is a block diagram illustrating a video system for controlling digital rights management of video data.

FIG. 1 is a block diagram illustrating a video system 100 for controlling digital rights management (DRM) of video data. In this example video system 100, video processing system 104 is coupled with video source 102 and database 106. Video source 102 captures video and passes this data to video processing system 104 which analyzes the video, configures the digital rights management for the video, and stores the video in database 106. Other embodiments of video processing system 104 may pass video data from video source 102 directly to database 106 for recording, and then process the video retrieved from database 106 at a later time. Video processing system 104 analyzes the video to determine the contents of the video and then configures the digital rights management for application to the video.

Digital rights management may be configured to apply to an entire video stream, or portions of video data. For example, a video stream recording a transaction at a cashier's register may include video of the cashier scanning a customer's items, then accepting a credit card from the customer in payment for the items. While the scanning operation may not be worth protecting, the customer's credit card number must be protected by digital rights management. This example demonstrates two functions of video processing system 104. First, video processing system 104 detects the presence of the credit card, or other object, in the video. Next, video processing system 104 configures the DRM for the video to protect the credit card information.

The presence of a credit card, or any other desired object, may be recognized using any of a variety of methods. For example, video processing system 104 may analyze individual frames of the video stream to detect any objects in the video appearing to be credit cards. Alternately, video processing system 104 may receive a signal from the cashier's station that a credit card is in use, such as when the customer swipes the card in a credit card reader. This signal may act to trigger video processing system 104 to begin analysis of the video looking for credit cards in the frames of the video stream, or to begin DRM at that time in the video.

Figure 9:
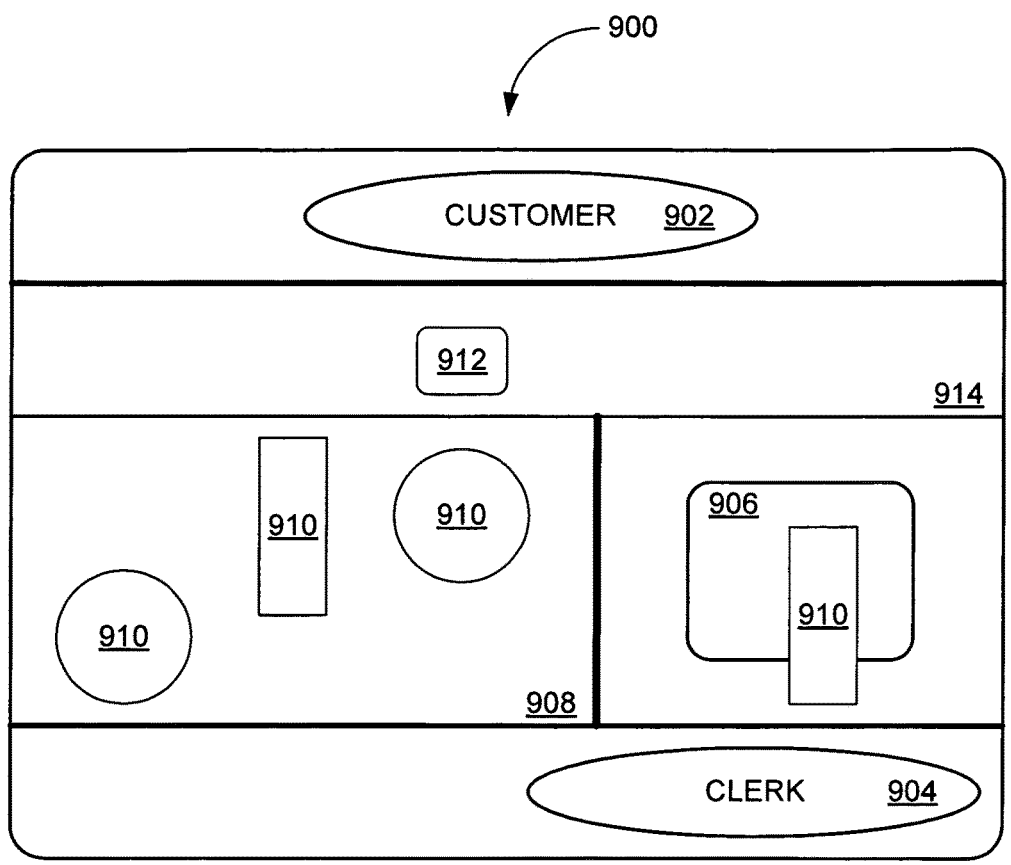
FIG. 9 is an illustration of an example video frame in a video system for controlling digital rights management of video data.
Figure 10:
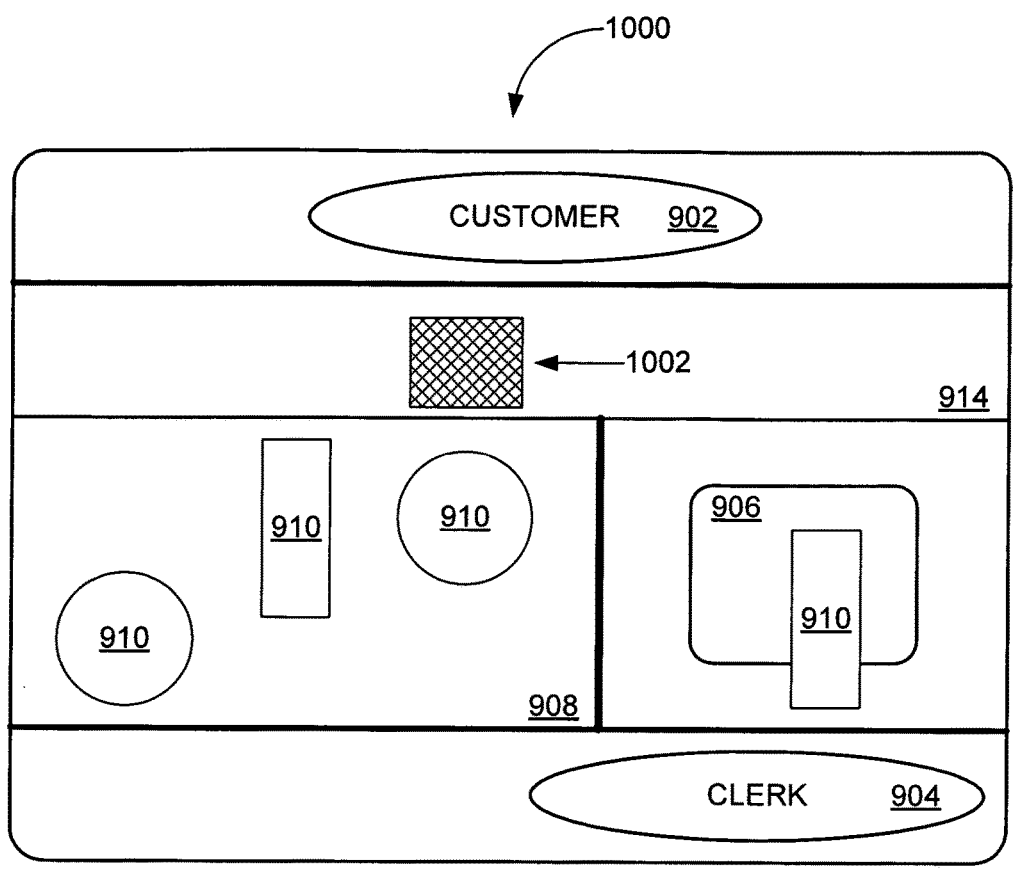
FIG. 10 is an illustration of an example video frame in a video system for controlling digital rights management of video data.

In this example, DRM may be applied to the portion of the video where the customer's credit card is visible. The DRM may be configured to allow copying of the video except for the portion where the credit card is in sight. This DRM may be configured in any of a variety of methods. The DRM may be configured to obscure the video during the portion of the data stream where the credit card is visible. Alternatively, video processing system 104 may configure the DRM for the video such that when the video is read from database 106, only the portions of the video where the credit card is not visible are read. Other embodiments may obscure portions of the frames of the video where the credit card is located. This allows a user to see all of the transaction but not the credit card itself. This example is illustrated in FIGS. 9 and 10 and described below.

Figure 2:
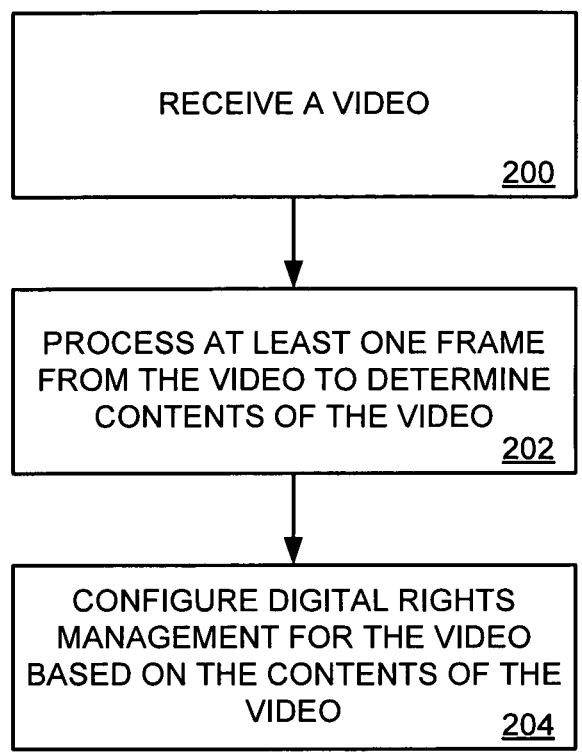
FIG. 2 is a flow diagram illustrating a method for controlling digital rights management of video data.

FIG. 2 is a flow diagram illustrating a method for controlling digital rights management of video data. Reference numbers from FIG. 2 are indicated parenthetically below. Video processing system 104 receives a video from video source 102, (operation 200). Video processing system 104 then processes at least one frame from the video to determine the contents of the video, (operation 202). Video processing system 104 next configures the digital rights management for the video based on the contents of the video, (operation 204). As discussed above, this configuration of the DRM may take a wide variety of forms, including applying DRM to the entire video, applying DRM to some portion of the video, or applying DRM to some locations or objects within the video. Some embodiments may configure the DRM to control how many times a user may view the video, or to prevent copying the video or burning the video to a CD, DVD, hard drive, or other storage device.

Figure 3:
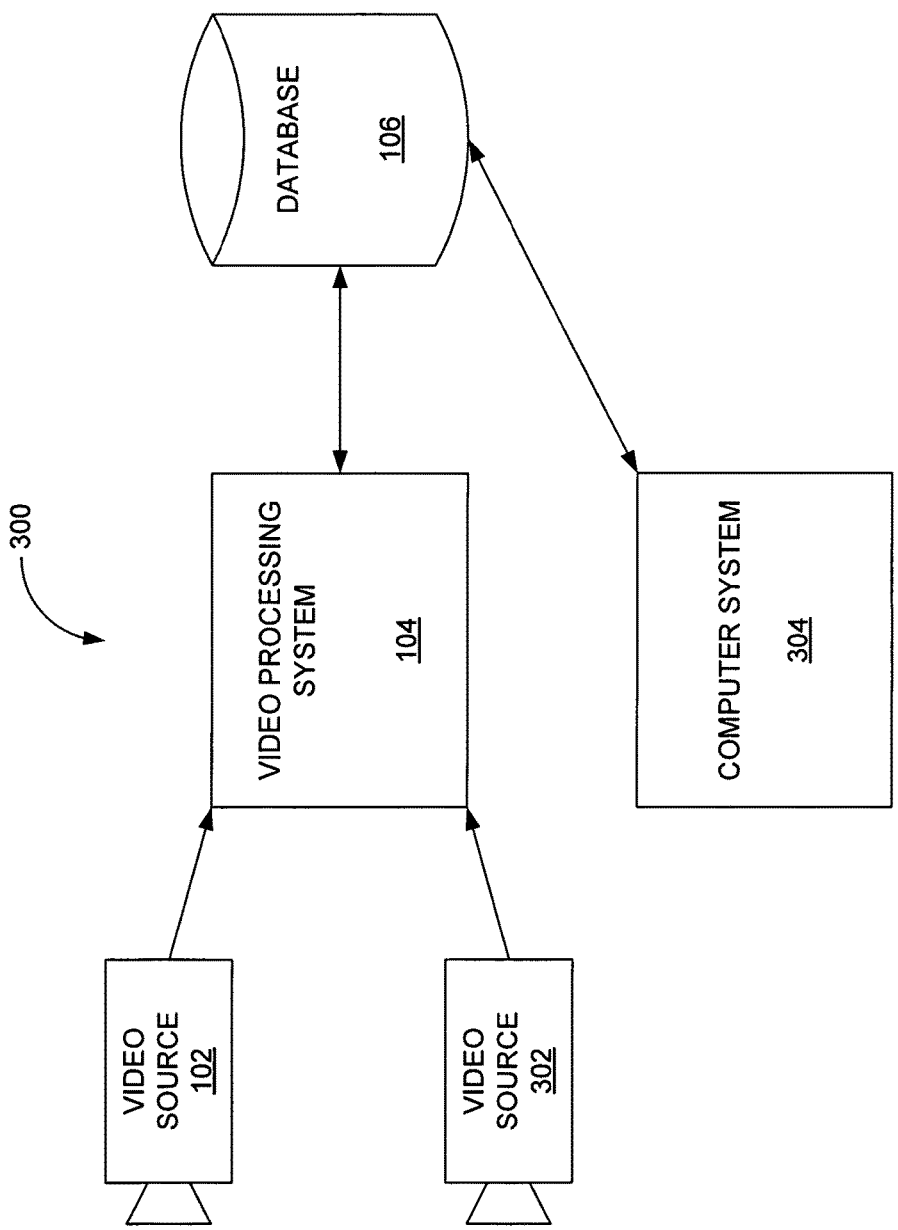
FIG. 3 is a block diagram illustrating a video system for controlling digital rights management of video data.

FIG. 3 is a block diagram illustrating a video system 300 for controlling digital rights management of video data. Similar to the video system 100 illustrated in FIG. 1, video processing system 104 is coupled with video source 102, and database 106. This example also includes video source 302 also coupled with video processing system 104 and computer system 304 coupled with database 106. Video processing system 104 analyses video from video source 102, video source 302, and database 106 and configures DRM for this video to control the access that computer system 304 has to the video data stored on database 106.

For example, the DRM may be configured to allow only certain users of computer system 304 access to video data in database 106, or it may be configured to block or obscure portions of videos stored in database 106 when they are accessed by computer system 304.

Figure 4:
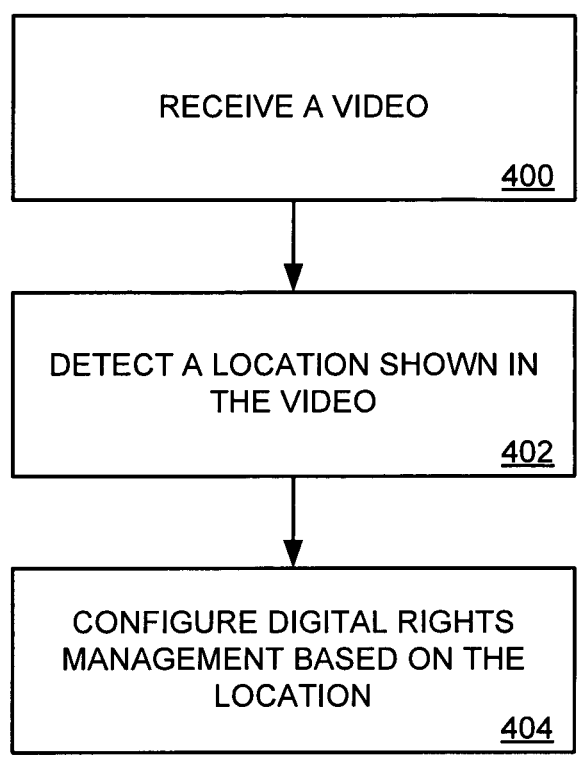
FIG. 4 is a flow diagram illustrating a method for controlling digital rights management of video data.

FIG. 4 is a flow diagram illustrating a method for controlling digital rights management of video data. Reference numbers from FIG. 4 are indicated parenthetically below. As discussed above, it may be desired to configure DRM for a video such that some locations shown in the video, such as a pharmacy counter, have a different level of protection than other locations. Video processing system 104 receives a video from video source 102, video source 302, or database 106, (operation 400). Video processing system 104 detects a location shown in the video stream, (operation 402). Video processing system 104 then configures the digital rights management for the video based on the location, (operation 404). In this example, the DRM may be configured to allow unlimited copying of portions of the video showing some locations while prohibiting copying of portions of the video showing other locations. Some examples may obscure some locations within the video when accessed by some users, while allowing other users to view all locations within the video.

Figure 5:
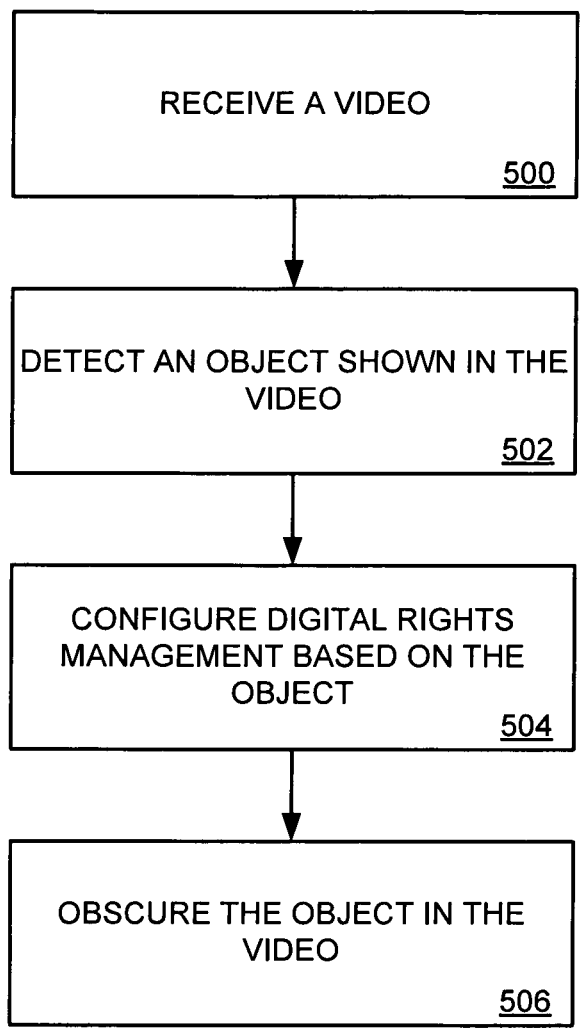
FIG. 5 is a flow diagram illustrating a method for controlling digital rights management of video data.

FIG. 5 is a flow diagram illustrating a method for controlling digital rights management of video data. Reference numbers from FIG. 5 are indicated parenthetically below. As discussed above, it may be desired to configure DRM for a video stream such that some objects shown in the video, such as a credit card, have a different level of protection than other locations. Video processing system 104 receives a video from video source 102, video source 302, or database 106, (operation 500). Video processing system 104 detects an object shown in the video, (operation 502). Video processing system 104 then configures the digital rights management for the video based on the object, (operation 504). Optionally, video processing system 104 obscures the object in the video, (operation 506). In this example, the DRM may be configured to allow unlimited copying of portions of the video showing some objects while prohibiting copying of portions of the video showing other objects. In some cases, the entire video may contain sensitive objects, requiring the DRM to be configured to prohibit copying of the entire video. Some examples may obscure some objects within the video when accessed by some users, while allowing other users to view the entire frame of the video.

There are a very wide variety of objects that may be detected and protected by DRM in various embodiments. For example, any object containing personal information, such as a driver's license, social security card, credit card, debit card, check book, cell phone screens, and other such objects may be detected and protected by video processing system 104. In these examples, video processing system 104 may be configured to detect a wide variety of objects and to configure DRM separately for each object. Further, a plurality of sensitive objects may be present in a single video frame, and video processing system 104 may configure DRM based on these different objects. In some systems, faces may be detected and obscured to prevent identification of individuals, and protect their privacy. This may be important in such cases as witness interviews, surveys, and the like where individual privacy rights are important.

Figure 6:
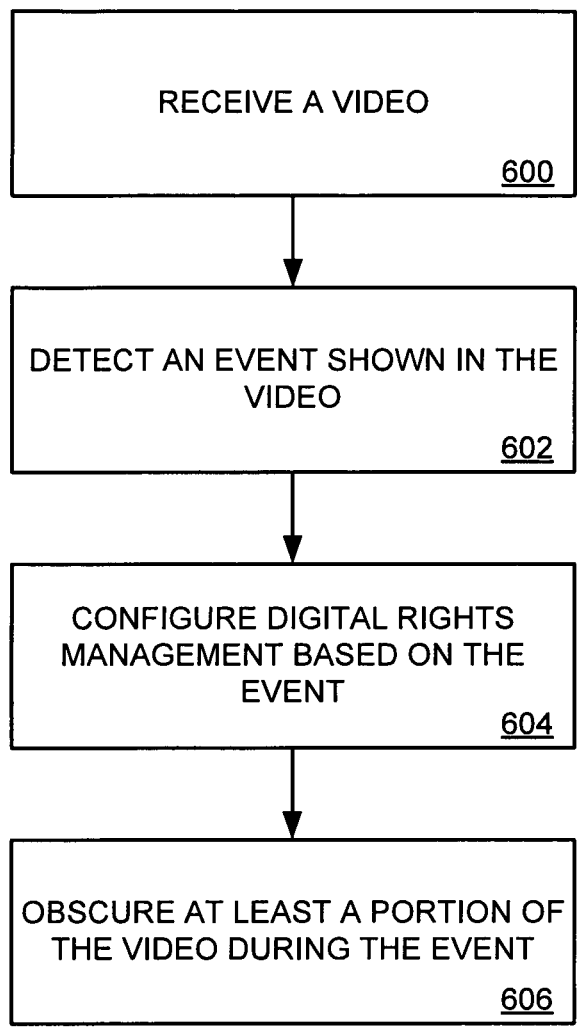
FIG. 6 is a flow diagram illustrating a method for controlling digital rights management of video data.

FIG. 6 is a flow diagram illustrating a method for controlling digital rights management of video data. Reference numbers from FIG. 6 are indicated parenthetically below. As discussed above, it may be desired to configure DRM for a video such that some events shown in the video, such as a transaction at a pharmacy counter, have a different level of protection than other locations. Video processing system 104 receives a video from video source 102, video source 302, or database 106, (operation 600). Video processing system 104 detects an event shown in the video, (operation 602). Video processing system 104 then configures the digital rights management for the video based on the event, (operation 604). Optionally, video processing system 104 obscures at least a portion of the video during the event, (operation 606). In this example, the DRM may be configured to allow unlimited copying of portions of the video showing some events while prohibiting copying of portions of the video showing other events. Some examples may obscure a portion of the video during the event when accessed by some users, while allowing other users to view the entire video.

Figure 7:
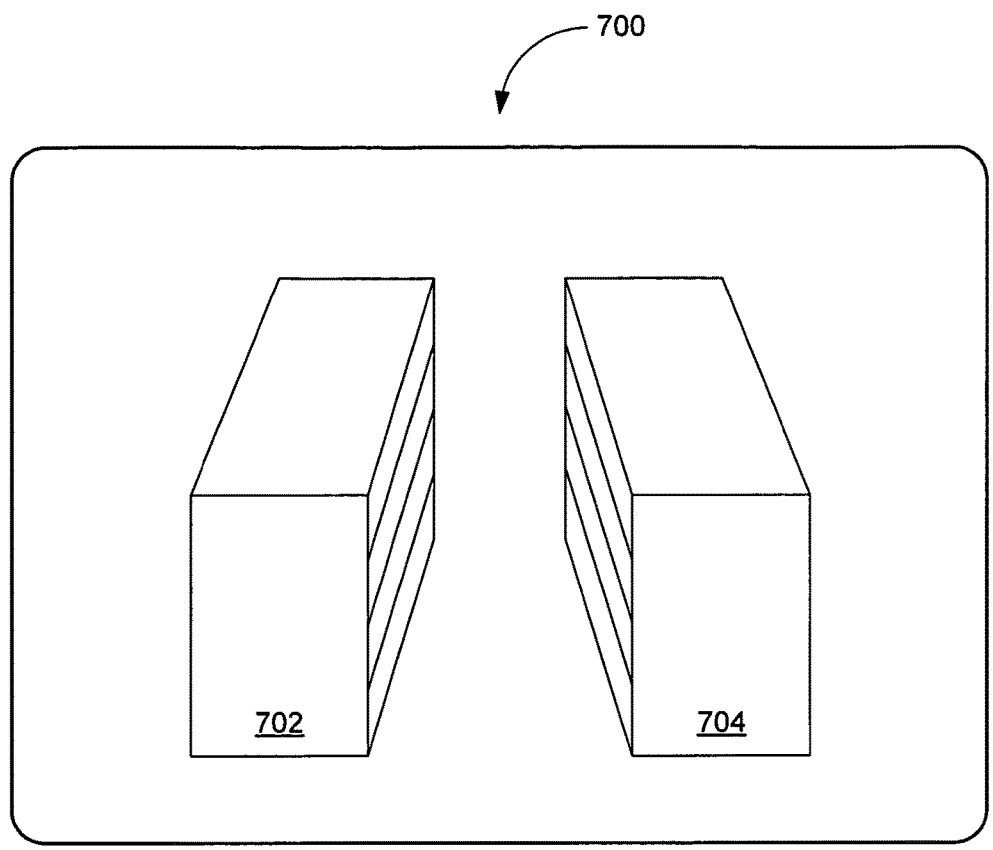
FIG. 7 is an illustration of an example video frame in a video system for controlling digital rights management of video data.

FIG. 7 is an illustration of an example video frame 700 in a video system for controlling digital rights management of video data. This example video frame 700 includes product shelf 702 and product shelf 704. In this example, product shelf 704 contains items with higher privacy expectations than product shelf 702. For example product shelf 704 may contain pharmaceuticals, while product shelf 702 may contain breakfast cereal. Thus, it may be desirable to configure different levels of DRM for the two shelves, using the method illustrated in FIG. 4.

Figure 8:
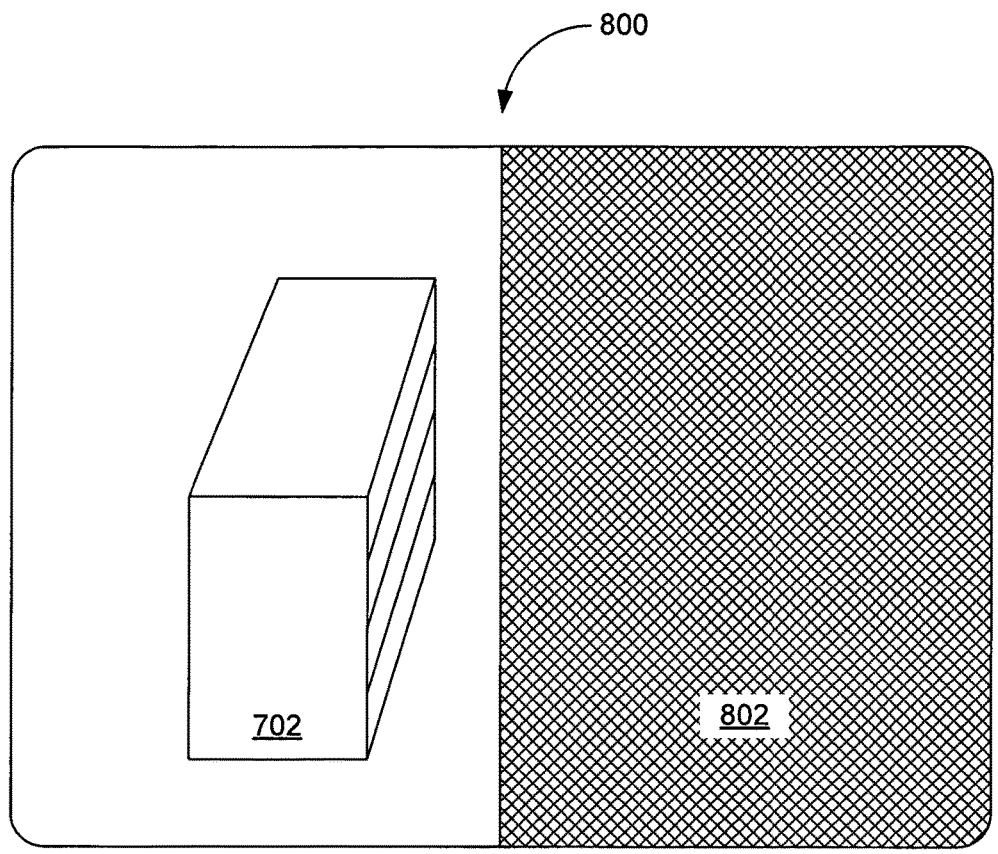
FIG. 8 is an illustration of an example video frame in a video system for controlling digital rights management of video data.

FIG. 8 is an illustration of an example video frame 800 in a video system for controlling digital rights management of video data. In this example, product shelf 704 has been obscured by video processing system 104 such that a black screen 802 covers the area within video frame 800 occupied by product shelf 704, while product shelf 702 is fully visible. This selective DRM may be applied on a frame-by-frame basis in the situation where a camera pans, shifts, or zooms over protected areas.

FIG. 9 is an illustration of an example video frame 900 in a video system for controlling digital rights management of video data. In this example of a video camera looking down on a cashier's register, customer 902 stands at counter 914 while clerk 904 scans a quantity of items 910 that customer 902 is purchasing. Clerk 904 scans each item 910 over the scanner 906 and then places the items 910 on conveyor belt 908. In this frame 900, customer 902 has placed their credit card 912 on counter 914 prior to paying for the items 910. Since the information printed on the customer's 902 credit card 912 is sensitive, it is desired to apply DRM selectively to credit card 912 while allowing video of the remainder of the transaction to be freely read and copied. Thus, DRM may be configured to selectively apply to credit card 912 using the method illustrated in FIG. 5.

FIG. 10 is an illustration of an example video frame 1000 in a video system for controlling digital rights management of video data. In this example, credit card 912 has been obscured by a black box 1002 within the video frame 1000. Other embodiments may configure the DRM for this video to prohibit viewing and copying of frames where credit card 912 is visible, while this example simply obscures credit card 912. This selective DRM may be applied on a frame-by-frame basis in the situation where a camera pans, shifts, or zooms over protected objects.

The methods, systems, devices, processors, equipment, and servers described above may be implemented with, contain, or be executed by one or more computer systems. The methods described above may also be stored on a computer readable medium for execution by a computer system. Many of the elements of video system 300 may be, comprise, or include computer systems. This includes, but is not limited to video processing system 104, database 106, and computer system 304. These computer systems are illustrated, by way of example, in FIG. 11.

Figure 11:
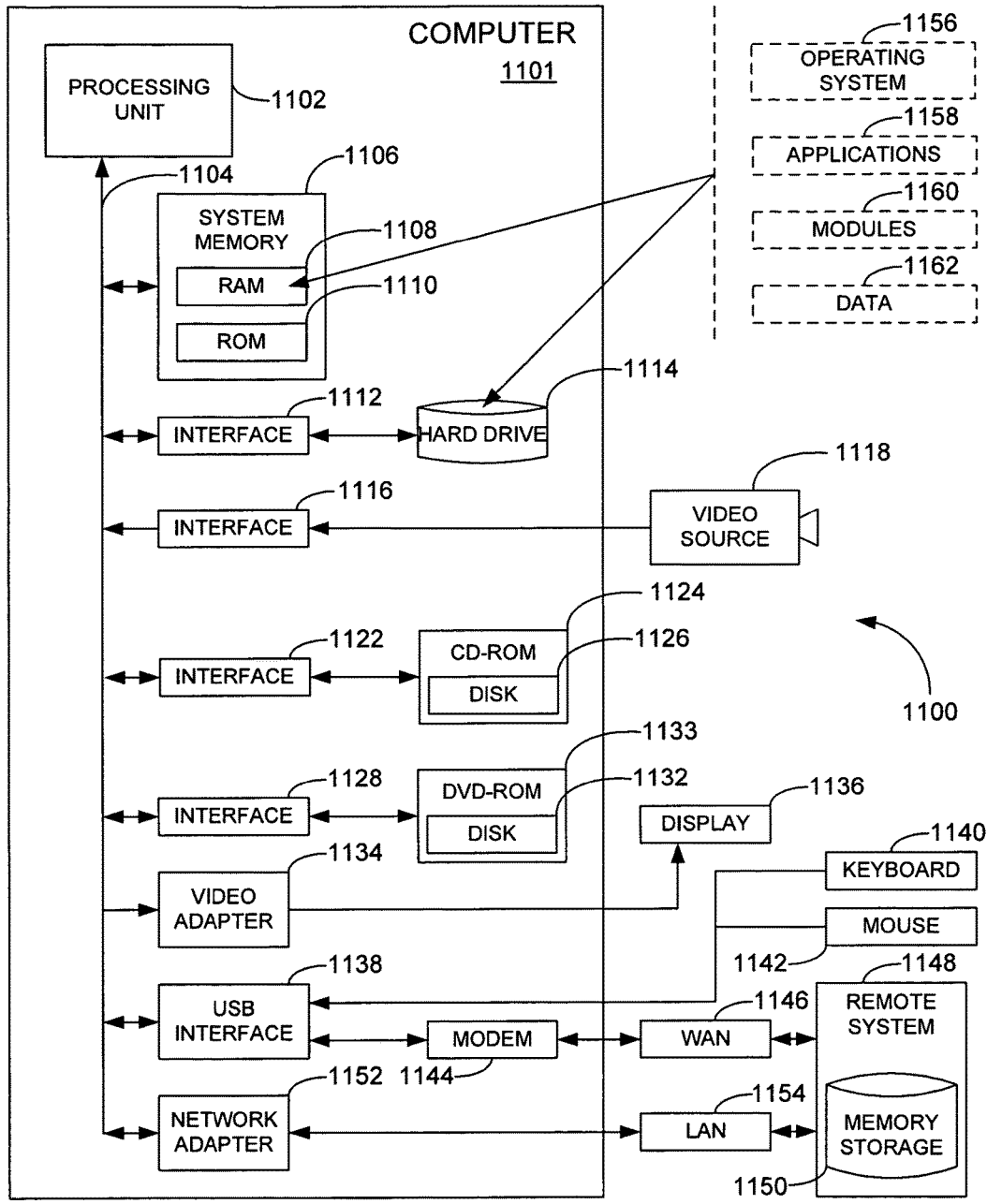
FIG. 11 is a block diagram illustrating a computer system including a computer configured to operate as a video processing system for controlling digital rights management of video data.

FIG. 11 is a block diagram illustrating a computer system 1100 including a computer 1101 configured to operate as a video processing system 104, such as that illustrated in FIGS. 1 and 3. Computer system 1100 includes computer 1101 which in turn includes processing unit 1102, system memory 1106, and system bus 1104 that couples various system components including system memory 1106 to processing unit 1102. Processing unit 1102 may be any of a wide variety of processors or logic circuits, including the Intel X86 series, Pentium, Itanium, and other devices from a wide variety of vendors. Processing unit 1102 may include a single processor, a dual-core processor, a quad-core processor or any other configuration of processors, all within the scope of the present invention. Computer 1101 could be comprised of a programmed general-purpose computer, although those skilled in the art will appreciate that programmable or special purpose circuitry and equipment may be used. Computer system 1100 may be distributed among multiple devices that together comprise elements 1102-1162.

There are a wide variety of system bus 1104 architectures, such as PCI, VESA, Microchannel, ISA, and EISA, available for use within computer 1101, and in some embodiments multiple system buses may be used within computer 1101. System memory 1106 includes random access memory (RAM) 1108, and read only memory (ROM) 1110. System ROM 1110 may include a basic input/output system (BIOS), which contains low-level routines used in transferring data between different elements within the computer, particularly during start-up of the computer. System memory 1106 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, system memory 1106 may incorporate electronic, magnetic, optical, and/or other types of storage media. Note that system memory 1106 can have a distributed architecture, where various components are situated remote from one another, but can be accessed by processing unit 1102.

Processing unit 1102 receives software instructions from system memory 1106 or other storage elements and executes these instructions directing processing unit 1102 to operate in a method as described herein. These software instructions may include operating system 1156, applications 1158, modules 1160, utilities, drivers, networking software, and data 1162. Software may comprise firmware, or some other form of machine-readable processing instructions.

Computer 1101 also includes hard drive 1114 coupled to system bus 1104 through hard drive interface 1112, CD-ROM drive 1124 containing CD-ROM disk 1126 coupled to system bus 1104 through CD-ROM drive interface 1122, and DVD-ROM drive 1133 containing DVD-ROM disk 1132 coupled to system bus 1104 through DVD-ROM drive interface 1128. There are a wide variety of other storage elements, such as flash memory cards and tape drives, available for inclusion in computer 1101, which may be coupled to system bus 1104 through a wide variety of interfaces. Also, these storage elements may be distributed among multiple devices, as shown here, and also may situated remote from each other, but can be accessed by processing unit 1102.

Computer 1101 further includes video interface 1122 coupled to processing unit 1102 through system bus 1104, configured to receive video data from a video source 1124. This video source 1124 may be any combination of video cameras, video players, video recorders, or any other devices capable of transmitting video data to computer 1101. Video source 1124 may correspond to video sources 102 and 302 shown in FIGS. 1 and 3.

Computer 1101 also includes video adaptor 1134 configured to drive display 1136, and universal serial bus (USB) interface 1138 configured to receive user inputs from keyboard 1140 and mouse 1142. Other user interfaces could comprise a voice recognition interface, microphone and speakers, graphical display, touch screen, game pad, scanner, printer, or some other type of user device. These user interfaces may be distributed among multiple user devices. USB interface 1138 is also configured to interface with modem 1144 allowing communication with remote system 1148 through a wide area network (WAN) 1146, such as the internet. USB interface 1138 and network adaptor 1152 may be configured to operate as input ports capable of receiving video data from database 106 and as output ports to store videos and digital rights management configurations associated with the videos to database 106.

Computer 1101 further includes network adaptor 1152 configured to communicate to remote system 1148 through a local area network (LAN) 1145. There are a wide variety of network adaptors 1152 and network configurations available to allow communication with remote systems 1148, and any may be used in other embodiments. For example, networks may include Ethernet connections or wireless connections. Networks may be local to a single office or site, or may be as broad and inclusive as the Internet or Usenet. Remote systems 1148 may include memory storage 1150 in a very wide variety of configurations.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for controlling digital rights management of video, comprising:
   receiving, from a video source, a video showing a transaction station comprising a plurality of frames;
   receiving a signal from the transaction station indicating that an item of interest is in use;
   in response to the signal, processing at least one frame from the video to detect the item of interest in the video; and
   configuring digital rights management for the video to provide the video unobscured to certain users for viewing and to provide the video where the item of interest is obscured to other users.

2. The method of claim 1, wherein configuring digital rights management includes prohibiting copying frames of the video that show the item of interest while allowing copying frames of the video that do not show the item of interest.

3. The method of claim 1, wherein processing at least one frame from the video comprises:
   detecting a location shown in the video; and
   configuring digital rights management for the video based on the location.

4. The method of claim 1, wherein processing at least one frame from the video comprises:
   detecting an object other than the item of interest shown in the video; and
   configuring digital rights management for the video based on the one or more object.

5. The method of claim 4, wherein configuring digital rights management includes obscuring the item of interest and the object other than the item of interest-in the video based on different levels of protection.

6. The method of claim 1, wherein processing at least one frame from the video comprises:
   detecting an event shown in the video, wherein the event is indicated by the signal; and
   in response to the signal, configuring digital rights management for the video based on the event.

7. The method of claim 1, wherein the item of interest is a payment card.

8. A video processing system comprising:
   a video interface unit that receives video from a video source, the video interface unit electronically coupled to a processor;
   a signal interface unit that receives signals from a transaction station; and
   the processor electrically coupled with the two interfaces that:
     receives a video showing the transaction station from the video interface unit, comprising a plurality of frames;
     receives a signal from the signal interface unit indicating that a payment card is in use;
     in response to the signal, processes at least one frame from the video to detect the payment card in the video; and
     configures digital rights management for the video to provide the video with the payment card unobscured to certain users for viewing and to provide the video where the payment card is obscured to other users.

9. The video processing system of claim 8, wherein the processor further configures digital rights management by prohibiting copying frames of the video that show the payment card while allowing
   copying frames of the video that do not show the payment card.

10. The video processing system of claim 8, wherein the processor processes at least one frame from the video by:
    detecting a location shown in the video; and
    configuring digital rights management for the video based on the location.

11. The video processing system of claim 8, wherein the processor processes at least one frame from the video by:
    detecting an object other than the payment card shown in the video; and
    configuring digital rights management for the video based on the one or more object.

12. The video processing system of claim 11, wherein the processor configures digital rights management by obscuring the payment card and the object other than the payment card in the video based on different levels of protection.

13. The video processing system of claim 8, wherein the processor processes at least one frame from the video by:
    detecting an event shown in the video, wherein the event is indicated by the signal; and
    in response to the signal, configuring digital rights management for the video based on the event.

14. The video processing system of claim 13, wherein the processor configures digital rights management by obscuring at least a portion of the video during the event.

15. A non-transitory computer-readable medium having instructions stored thereon for operating a computer system, wherein the instructions, when executed by the computer system, direct the computer system to:
    receive, from a video source, a video showing a transaction station, comprising a plurality of frames;
    receive a signal from the transaction station indicating that a payment card is in use;
    in response to the signal, process at least one frame from the video to detect the payment card in the video; and
    configure digital rights management for the video by prohibiting copying frames of the video that show the payment card while allowing copying frames of the video that do not show the payment card.

16. The non-transitory computer-readable medium of claim 15, wherein the instructions further direct the computer system to process at least one frame from the video by:
    detecting a location shown in the video; and
    configuring digital rights management for the video based on the location.

17. The non-transitory computer-readable medium of claim 15, wherein the instructions further direct the computer system to process at least one frame from the video by:
    detecting an object other than the payment card shown in the video; and
    configuring digital rights management for the video based on the one or more object.

18. The non-transitory computer-readable medium of claim 17, wherein the instructions further direct the computer system to configure digital rights management by obscuring the payment card and the object other than the payment card in the video based on different levels of protection.

19. The non-transitory computer-readable medium of claim 15, wherein the instructions further direct the computer system to process at least one frame from the video by:
    detecting an event shown in the video, wherein the event is indicated by the signal; and
    in response to the signal, configuring digital rights management for the video based on the event.

20. The non-transitory computer-readable medium of claim 19, wherein the instructions further direct the computer system to configure digital rights management by obscuring at least a portion of the video during the event.

* * * * *